United States Patent
Chae et al.

(10) Patent No.: US 9,733,423 B2
(45) Date of Patent: Aug. 15, 2017

(54) BACKLIGHT ASSEMBLY AND DISPLAY DEVICE HAVING THE SAME

(71) Applicant: SAMSUNG DISPLAY CO., LTD., Yongin-si (KR)

(72) Inventors: Jae Hyun Chae, Hwaseong-si (KR); Young Min Park, Hwaseong-si (KR); Myoung Seok Son, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 116 days.

(21) Appl. No.: 14/610,471

(22) Filed: Jan. 30, 2015

(65) Prior Publication Data

US 2015/0369994 A1 Dec. 24, 2015

(30) Foreign Application Priority Data

Jun. 24, 2014 (KR) .......................... 10-2014-0077178

(51) Int. Cl.
*F21V 8/00* (2006.01)
*G02F 1/1335* (2006.01)

(52) U.S. Cl.
CPC ........... *G02B 6/009* (2013.01); *G02B 6/0085* (2013.01); *G02F 1/133608* (2013.01); *G02F 1/133615* (2013.01); *G02F 2001/133628* (2013.01)

(58) Field of Classification Search
CPC . G02B 6/009; G02B 6/0085; G02F 1/133608; G02F 1/133615; G02F 2001/133628
See application file for complete search history.

(56) References Cited

U.S. PATENT DOCUMENTS

| | | | | |
|---|---|---|---|---|
| 2001/0050731 A1* | 12/2001 | An | ........................ | G02B 6/0088 349/58 |
| 2006/0243948 A1* | 11/2006 | Ishiwa | ................. | G02B 6/0085 252/299.61 |
| 2006/0292461 A1* | 12/2006 | Shives | .............. | G02F 1/133385 430/7 |
| 2007/0091639 A1* | 4/2007 | Yoo | ....................... | G02B 6/0021 362/612 |
| 2007/0153548 A1* | 7/2007 | Hamada | ............... | G02B 6/0036 362/615 |
| 2007/0165424 A1* | 7/2007 | Sakai | ................... | G02B 6/0055 362/633 |

(Continued)

FOREIGN PATENT DOCUMENTS

JP WO 2010004794 A1 * 1/2010 ........... G02B 6/0085
KR 1020100111956 4/2009

(Continued)

*Primary Examiner* — Mary Ellen Bowman
(74) *Attorney, Agent, or Firm* — Cantor Colburn LLP

(57) ABSTRACT

A backlight assembly includes a light source, a circuit board on which the light source is disposed, a light guide plate in which light emitted from the light source is incident on one surface and the incident light is emitted to another surface, a bottom chassis configured to accommodate the light guide plate, and a fixing frame coupled to the bottom chassis and configured to fix the circuit board. The fixing frame includes a first fixing frame on which the circuit board is disposed and a second fixing frame separably coupled to the first fixing frame and disposed on a bottom surface of the bottom chassis.

21 Claims, 5 Drawing Sheets

(56) References Cited

U.S. PATENT DOCUMENTS

| | | | |
|---|---|---|---|
| 2008/0043169 A1* | 2/2008 | Kim | G02B 6/0085 |
| | | | 349/65 |
| 2008/0043194 A1* | 2/2008 | Lin | G02B 6/0085 |
| | | | 349/149 |
| 2010/0007817 A1* | 1/2010 | Kim | G02B 6/0083 |
| | | | 349/60 |
| 2010/0066939 A1* | 3/2010 | Ohashi | G02B 6/0085 |
| | | | 349/58 |
| 2010/0328638 A1* | 12/2010 | Ishida | G03F 7/7005 |
| | | | 355/67 |
| 2012/0099341 A1 | 4/2012 | Kwon et al. | |
| 2012/0229726 A1* | 9/2012 | Kim | G02F 1/1336 |
| | | | 349/58 |

FOREIGN PATENT DOCUMENTS

| | | |
|---|---|---|
| KR | 1020100018164 | 2/2010 |
| KR | 1020120042425 | 5/2012 |
| KR | 1020120103261 | 9/2012 |

\* cited by examiner

BACKLIGHT ASSEMBLY AND DISPLAY DEVICE HAVING THE SAME

This application claims priority to Korean Patent Application No. 10-2014-0077178, filed on Jun. 24, 2014, and all the benefits accruing therefrom under 35 U.S.C. §119, the content of which is incorporated herein in its entirety by reference.

BACKGROUND (1) Field

Embodiments of the invention relate to a backlight assembly having improved heat dissipation and to a display device including the same.

(2) Description of the Related Art

A liquid crystal display ("LCD") is a type of flat panel display ("FPD"), which is the most widely used type of display devices. The LCD is configured such that a liquid crystal layer is interposed between two substrates including electrodes, so that liquid crystal molecules of the liquid crystal layer are rearranged upon application of a voltage to the electrodes, thereby varying the amount of transmitted light through the liquid crystal layer.

An LCD, which is a passive light emitting device, includes a display panel for displaying an image and a backlight assembly for supplying light to the display panel. The backlight assembly is classified into one of three types: a direct type, an edge type and a corner type. These three types of backlight assemblies are differentiated based on the position of a light source relative to a light guide plate of the backlight assembly.

A heat dissipation structure of a backlight assembly, which dissipates heat produced by a light source, is highly desired that can minimize performance degradation of the backlight assembly.

It is particularly desired to effectively dissipate heat produced by a light source, such as when a light-emitting diode ("LED") is used, in a corner-type backlight structure in which a single light source or a small number of light sources are disposed at a corner portion of a light guide plate or in an edge-type backlight structure in which a plurality of light sources are disposed at an edge portion of a light guide plate.

SUMMARY

Exemplary embodiments of the invention are directed toward a backlight assembly including a fixing frame having a structure divided into two parts and configured to release heat produced by a light source, and also directed toward a display device including the backlight assembly including the fixing frame having the structure divided into two parts.

According to an exemplary embodiment of the invention, a backlight assembly includes a light source, a circuit board on which the light source is disposed, a light guide plate in which light emitted from the light source is incident on one surface and the incident light is emitted to another surface, a bottom chassis configured to accommodate the light guide plate, and a fixing frame coupled to the bottom chassis and configured to fix the circuit board. The fixing frame includes a first fixing frame on which the circuit board is disposed, and a second fixing frame separably coupled to the first fixing frame and disposed on a bottom surface of the bottom chassis.

The fixing frame may be in contact with the circuit board and may release heat produced by the light source.

The backlight assembly may further include a heat dissipation member interposed between the first and second fixing frames.

The heat dissipation member may include a phase change material.

The first fixing frame may be disposed between the bottom chassis and the circuit board.

The first fixing frame may include a base portion and at least one heat sink protruding from one surface of the base portion.

The heat sink may be coupled to the second fixing frame.

The backlight assembly may further include a heat dissipation member interposed between the heat sink and the second fixing frame.

The second fixing frame may be disposed between the light guide plate and the bottom chassis.

The second fixing frame may be shaped like a plate.

The second fixing frame may be larger in area than the first fixing frame.

The backlight assembly may further include a fixing member configured to fix the fixing frame to the bottom chassis.

The backlight assembly may further include a liquid crystal display panel and a mold frame on which the liquid crystal display panel is seated.

The backlight assembly may further include a first fixing member configured to couple the mold frame and the first fixing frame to each other.

The backlight assembly may further include a second fixing member configured to couple the second fixing frame and the bottom chassis to each other.

The first fixing frame may be in contact with at least one surface of an upper surface, lower surface, and rear surface of the circuit board when the light source is disposed on a front surface opposite the rear surface of the circuit board in a cross section view.

The fixing frame may be disposed at a corner portion of the bottom chassis.

According to exemplary embodiments of the invention, a backlight assembly includes a fixing frame including a heat dissipation member so that the fixing frame and a circuit board are coupled to each other, thereby improving reliability and heat dissipation properties. The fixing frame may have a separable (detachable) structure, thereby increasing process productivity of the backlight assembly and of a display device including the backlight assembly including the fixing frame having the structure divided into two parts.

BRIEF DESCRIPTION OF THE DRAWINGS

The above and other features and exemplary embodiments of the invention will be more clearly understood from the following detailed description taken in conjunction with the accompanying drawings, in which.

DETAILED DESCRIPTION

Figure 1:
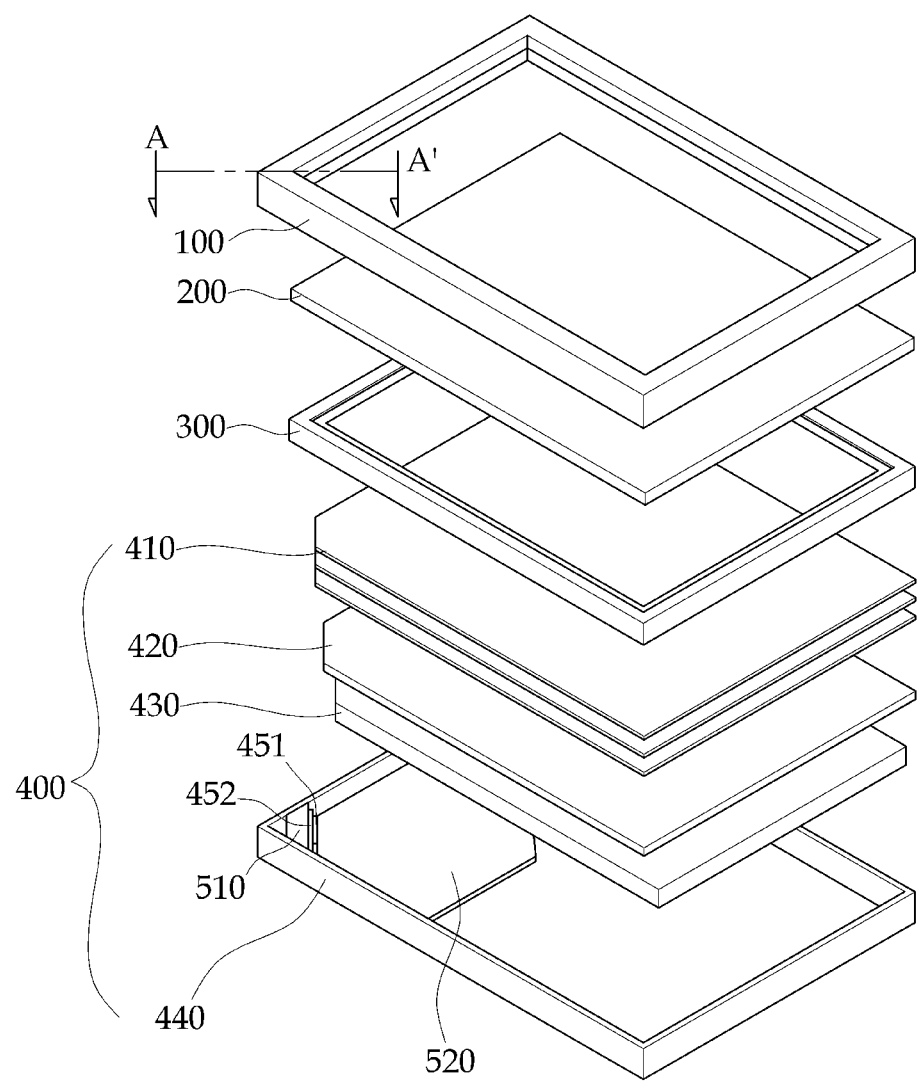
FIG. 1 is an exploded perspective view illustrating an exemplary embodiment of a display device according to the invention.

Although the invention can be modified in various manners and have several embodiments, specific embodiments are illustrated in the accompanying drawings and will be mainly described in the specification. However, the scope of the exemplary embodiments of the invention is not limited to the specific embodiments and should be construed as including all the changes, equivalents, and substitutions included in the spirit and scope of the invention.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example In an exemplary embodiment, if when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a backlight assembly and a display device according to an exemplary embodiment of the invention will be fully described with reference to FIGS. 1 to 3. This disclosure includes an exemplary embodiment of a liquid crystal display panel 200, but exemplary embodiments of the invention are not limited thereto. In addition to the liquid crystal display panel 200 illustrated, any panel structure that is available that is capable of displaying an image by receiving light from a backlight assembly 400 is contemplated.

FIG. 1 is an exploded perspective view illustrating an exemplary embodiment of a display device according to the invention. FIG. 2 is a cross-sectional view taken along line A-A' of FIG. 1. FIG. 3 is an exploded partial perspective view illustrating an exemplary embodiment of first and second fixing frames accommodated in a bottom chassis of the display device of FIG. 1.

Figure 2:
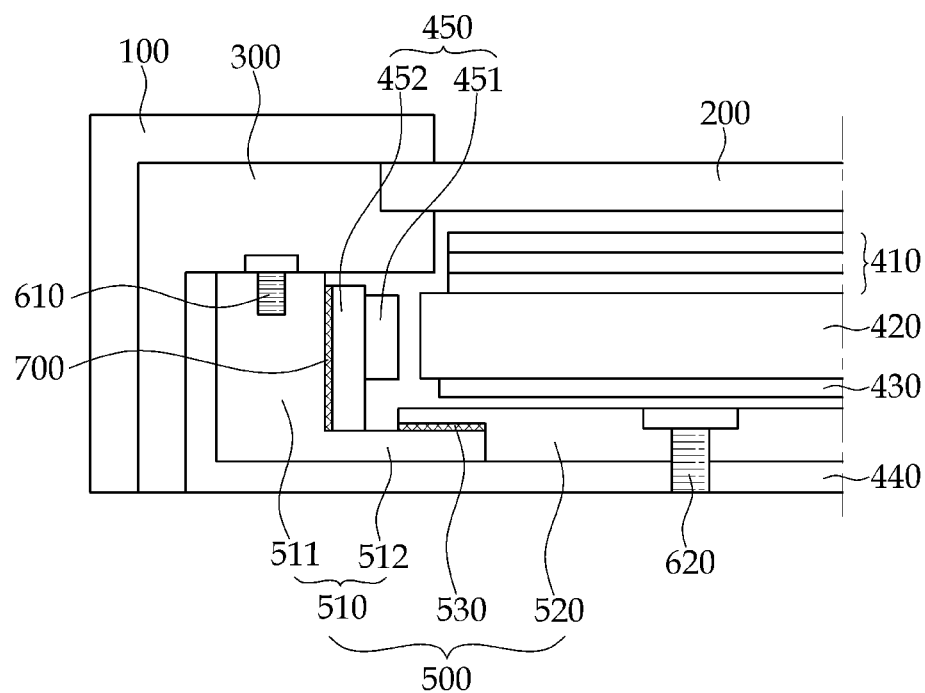
FIG. 2 is a cross-sectional view taken along line A-A' of FIG. 1.
Figure 3:
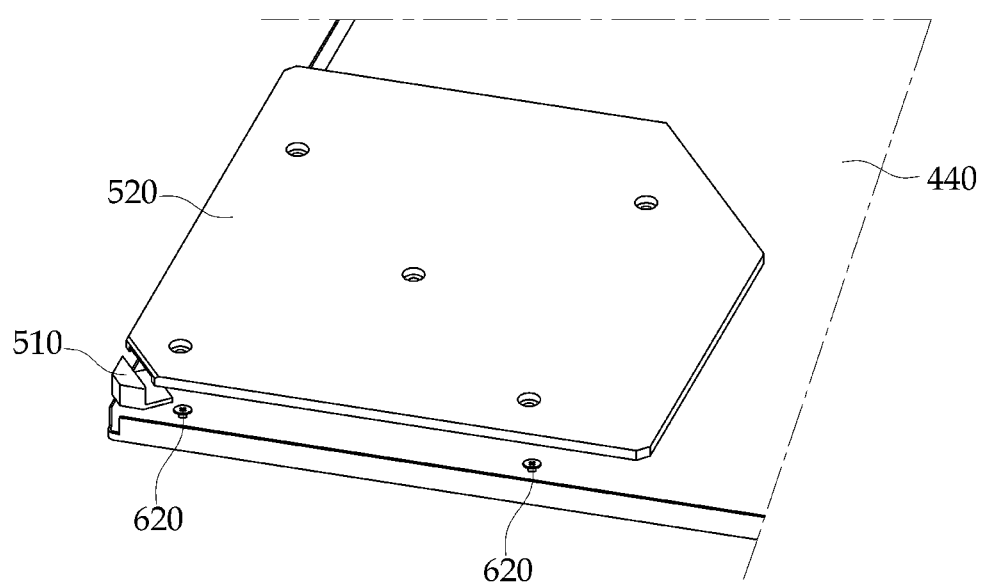
FIG. 3 is an exploded partial perspective view illustrating an exemplary embodiments of first and second fixing frames accommodated in a bottom chassis of the display device of FIG. 1.

Referring to FIGS. 1 to 3, the display device may include a display panel 200 (e.g., a liquid crystal display ("LCD") panel 200) configured to display an image according to an input signal, a backlight assembly 400 configured to supply light to the display panel 200, a top chassis 100 provided to cover the display panel 200, and a mold frame 300 configured to connect the top chassis 100 to a bottom chassis 440. The display panel 200 may be disposed on the mold frame 300, or seated on the mold frame 300 as illustrated.

The mold frame 300 may be coupled to the bottom chassis 440, and may accommodate the display panel 200. The mold frame 300 may be made of a flexible material, such as plastic, for example, but not limited thereto, in order to absorb impact and protect the display panel 200.

The top chassis 100 may be coupled to the mold frame 300 and the bottom chassis 440 so as to cover the display panel 200 seated on the mold frame 300. The top chassis 100 may have an open window (which may be positioned in a central portion of the top chassis 100) to expose a display area of the display panel 200 to display an image therethrough.

The top chassis 100 may be coupled to the mold frame 300 and the bottom chassis 440 by an assembling member, such as hooks, fasteners and/or screws, for example, but not limited thereto, as other methods and/or mechanisms may be involved. The top chassis 100 and the bottom chassis 440 may be coupled to each other through one or more of the variety of methods and/or mechanisms.

The backlight assembly 400 may include an optical sheet 410, a light guide plate 420, a reflective sheet 430, a bottom chassis 440, a light source unit 450 (FIG. 2), and a fixing frame 500 (FIG. 2).

The light source unit 450 may include a light source 451 and a circuit board 452 on which the light source 451 is disposed. The light source unit 450 may be disposed at a corner edge or on a side edge of the light guide plate 420. The light source unit 450 may emit light toward a light incident surface at a corner portion or a side edge surface of the light guide plate 420. The light source 450 may include at least one LED chip, a phosphor applied on the LED chip to convert light emitted from the LED chip to light with predetermined wavelengths, and a package to accommodate the LED chip and the phosphor. The circuit board 452 may be, for example, a printed circuit board ("PCB") or a metal core PCB. A light source unit 450 may be disposed on one side edge surface, each of two side edge surfaces, or each of four side edge surfaces of the light guide plate 420. A light source unit 450 may be disposed on at least one side edge portion of the light guide plate 420. One or more light source units 450 may be deployed in consideration of the size, the brightness uniformity requirements, and/or other factors associated with the display panel 200.

The light source unit 450 may be coupled to the fixing frame 500 for rapid heat dissipation from and immovably fixing the light source unit 450. A variety of methods, e.g., screws, fasteners, hooks, and the like, may be employed to fix the light source unit 450 to the fixing frame 500.

In the case where the light source unit 450 and the fixing frame 500 are coupled to each other by assembling members such as hooks, fasteners and/or screws, a gap of about 10 μm to about 200 μm may exist between the light source unit 450 and the fixing frame 500 because of the limitation of a precision degree of manufacturing, and thus heat transfer may not be efficient due to the gaps between the light source unit 450 and the fixing frame 500.

Accordingly, in order to rapidly transfer heat generated by the light source unit 450, a heat dissipation material 700 having high thermal conductivity may be interposed between the circuit board 452 and the fixing frame 500 so that the light source unit 450 may be fixed to the fixing frame 500. The heat dissipation material 700 may desirably include a thermally conductive adhesive layer or a graphite sheet. The kind of adhesive polymer resins used for the thermally conductive adhesive layer may not be particularly limited, and any resin that can be used as an adhesive in the art may be utilized. Examples of the adhesive polymer resin may include a silicone based resin, an acrylic resin, a urethane based resin, and the like. In an exemplary embodiment, the acrylic resin may be desirably used.

The graphite sheet may have an anisotropic thermal conductivity having higher thermal conductivity in a horizontal direction (i.e., along a plane defining the graphite sheet) than thermal conductivity in a vertical direction. Thus, the graphite sheet may conduct heat, which is generated by the LED chip of the light source unit 450, quickly in a horizontal direction, thereby reducing a hot spot phenomenon occurring in the light source unit 450.

Light emitted from the light source 451 may be incident toward at least one incident surface of the light guide plate 420. The light guide plate 420 may substantially uniformly supply light (from a surface other than the incident surface of the light guide plate 420) toward the display panel 200. The light source unit 450 may be disposed on at least one side edge of the light guide plate 420 and the light guide plate 420 may be accommodated in the bottom chassis 440. The light guide plate 420 may include at least one chamfered edge portion. Light from the light source 451 may be incident on the edge portion of the light guide plate 420. The light guide plate 420 may be provided in the form of, for example, a quadrilateral plate as large as the display panel 200. In exemplary embodiments of the invention, the light guide plate 420 may have one or more of various shapes and/or may include predetermined grooves, protrusions, and/or other structures according to the position(s) of the light source(s) 451.

The light guide plate 420 may be a plate, a sheet, or a film and may facilitate slimness of display devices in which it is employed.

The light guide plate 420 may be made of a light-transmissive material such as, for example, an acrylic resin such as polymethylmethacrylate ("PMMA") or polycarbonate ("PC") so as to guide light efficiently.

A pattern may be formed on at least one surface of the light guide plate 420. For example, on a lower surface, a scattering pattern (not shown) may be formed so as to scatter and/or reflect the guided light upwards towards the opening in the top chassis 100.

The optical sheet 410 may be disposed on an upper portion of the light guide plate 420. The optical sheet 410 may diffuse and/or collimate light transmitted from the light guide plate 420. The optical sheet 410 may include one or more of a diffusion sheet, a prism sheet, a protective sheet, and/or one or more other functional sheets. The diffusion sheet may disperse light incident from the light guide plate 420 so as to prevent the light from being partly concentrated. The prism sheet may include prisms having a triangular cross-section and formed in a predetermined array on one surface of a base film defining the prism sheet. This prism sheet may be disposed on the diffusion sheet and may collimate light diffused from the diffusion sheet in a direction perpendicular to a major surface pane defining the display panel 200. The protective sheet may be disposed on the prism sheet. The protective sheet may serve to protect a surface of the prism sheet and to diffuse light in order to make light distribution uniform.

The reflective sheet 430 may be disposed between the light guide plate 420 and the bottom chassis 440, so that light emitted downwards from the light guide plate 420 may be reflected toward the display panel 200, thereby increasing light efficiency.

The reflective sheet 430 may be made of, for example, polyethylene terephthalate ("PET") which imparts reflective properties. One surface of the reflective sheet 430 may be coated with a diffusion layer containing, for example, titanium dioxide, but is not limited thereto.

In an exemplary embodiment, the reflective sheet 430 may be made of a material containing a metal, such as silver (Ag), for example, but not limited thereto.

The bottom chassis 440 may include a bottom portion and a sidewall portion. The bottom portion may accommodate the reflective sheet 430 and the light guide plate 420, and may be disposed parallel to the light guide plate 420. The sidewall portion may extend from the bottom portion and may have a bent shape. The bottom chassis 440 may be made of a metal material having hardness, such as stainless steel, or a material having good heat dissipation properties, such as aluminum or an aluminum alloy. The bottom chassis 440 may be responsible for maintaining a framework of a display device and protecting a variety of components accommodated therein.

The fixing frame 500 may be coupled to the bottom chassis 440 and may fix the circuit board 452. The fixing frame 500 may be disposed on one side of the bottom chassis 440 and may rapidly dissipate heat generated by the light source unit 450 out of the bottom chassis 440. The fixing frame 500 may serve to dissipate heat and also may maintain a framework of a display device by being coupled to the bottom chassis 440.

Conventionally, the fixing frame 500 is integrally formed. In the case where the fixing frame 500 is integrally formed, a plate-shaped frame may be cut in a horizontal direction (along a major surface plane defining the fixing frame) at a side of the frame in order to form a bent portion on which the light source 451 is seated. That is, a process for cutting a great part of the plate-shaped frame in a horizontal direction may be performed to form a portion on which the light source 451 is seated. However, a great deal of scrap (metals left over from frame cutting) may be generated and process productivity may decrease.

According to one exemplary embodiment of the invention, the fixing frame 500 enables heat dissipation and an increase in process productivity. The fixing frame 500 will be described below with reference to FIGS. 2 to 5.

Figure 4A:
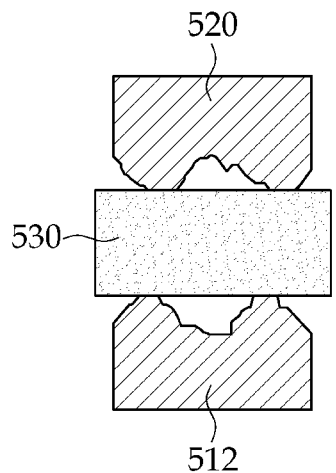
FIGS. 4A, 4B and 4C provide comparative partial cross-sectional views for comparing a general heat dissipation member including different thermal interface materials ("TIMs") in FIGS. 4A and 4B and a heat dissipation member including a phase change material in FIG. 4C.
Figure 4B:
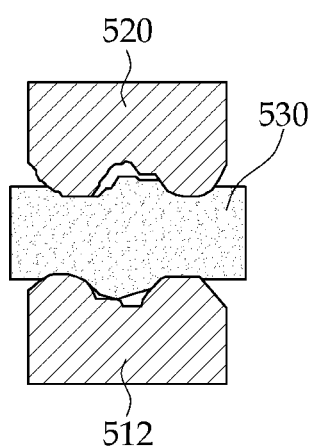
Figure 4C:
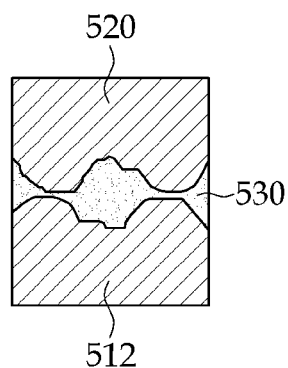
Figure 5:
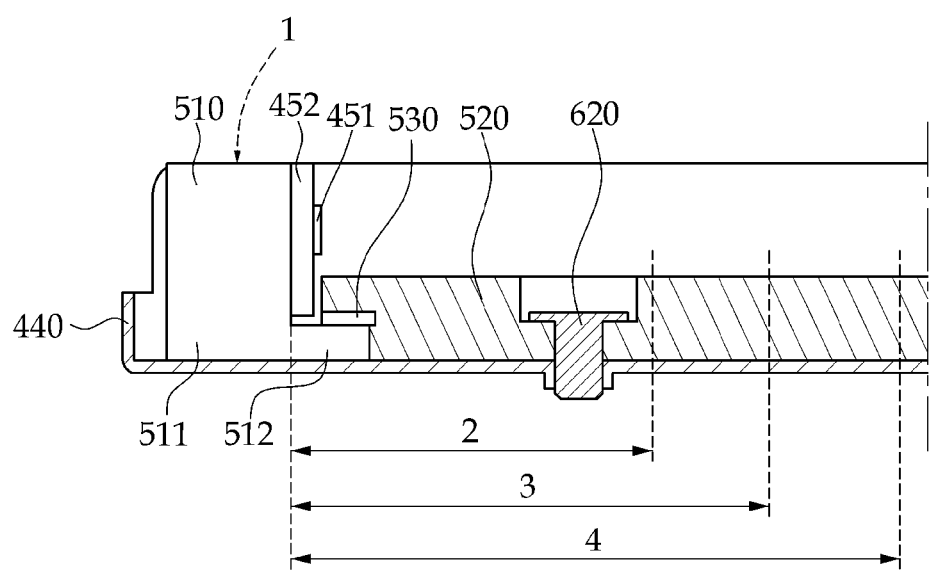
FIG. 5 is a partial cross-sectional view taken along line A-A' of FIG. 1 according to another exemplary embodiment of the invention illustrating heat dissipation effects of an exemplary embodiment of a fixing frame depending on distances from a light source.

FIGS. 4A, 4B and 4C provide comparative partial cross-sectional views for comparing a general heat dissipation member including different TIMs and a heat dissipation member including a phase change material, respectively. FIG. 5 is a partial cross-sectional view taken along line A-A' of FIG. 1 according to another exemplary embodiment of the invention illustrating heat dissipation effects of an exemplary embodiment of a fixing frame depending on distances from a light source.

The fixing frame 500 may include a first fixing frame 510 on which the circuit board 452 is disposed and a second fixing frame 520 separably coupled to the first fixing frame 510 and disposed on a bottom surface of the bottom chassis 440. The fixing frame 500 may be in contact with the circuit board 452 and may dissipate heat emitted from the light source 451. The fixing frame 500 may be disposed at a corner portion or edge portion of the bottom chassis 440.

The fixing frame 500 may include a metal having high thermal conductivity or powder having thermal conductivity, such as a polymer including metal powder, for the heat dissipation.

Additionally, the fixing frame 500 may be fixed to the mold frame 300 and the bottom chassis 440 by either a first fixing member 610 and/or a second fixing member 620. In an exemplary embodiment as shown, the first and second fixing members may be threaded fasteners, such as bolts, for example, but are not limited thereto.

The first fixing frame 510 may be disposed between the bottom chassis 440 and the circuit board 452. The first fixing frame 510 may include a base portion 511 and at least one heat sink 512 protruding from one surface of the base portion 511, the one surface defining a plane extending in a vertical direction in a cross section view. The first fixing frame 510 may be in contact with at least one surface of upper, lower, rear, and side surfaces of the circuit board 452 when the light source 451 is disposed on a front surface opposite the rear surface of the circuit board 452 in a cross section view. The first fixing frame 510 may transmit heat emitted from the light source 451 to the sidewall portion and bottom surface of the bottom chassis 440.

The circuit board 452 may be seated on the base portion 511 and the base portion 511 may be fixed to the sidewall portion and bottom surface of the bottom chassis 440. The heat sink 512 may be coupled to the second fixing frame 520. In more detail, the heat sink 512 may be coupled to the second fixing frame 520 with a heat dissipation member 530 interposed therebetween, which will be described below.

The first fixing frame 510 may be coupled to the mold frame 300 by a first fixing member 610. In one embodiment, the base portion 511 of the first fixing frame 510 may have a groove in an upper surface thereof and the base portion 511 may be coupled to the mold frame 300 by screws. Alternatively, the first fixing frame 510 may be coupled to the mold frame 300 by various methods such as hooks and the like. Further, the first fixing frame 510 may be coupled to the bottom chassis 440 by assembling members such as hooks and/or screws.

The second fixing frame 520 may be disposed between the light guide plate 420 and the bottom chassis 440. As illustrated in FIG. 3, the second fixing frame 520 may be shaped like a plate (e.g., substantially flat plate). The second fixing frame 520 may be larger in area than the first fixing frame 510 and may transmit heat emitted from the light source 451 to the bottom surface of the bottom chassis 440 via the second fixing frame 520 thermally connected to the first fixing frame 510.

The second fixing frame 520 may be coupled to the bottom chassis 440 by a second fixing member 620. In one exemplary embodiment, the second fixing frame 520 may have a groove, and then the second fixing frame 520 may be coupled to the bottom chassis 440 by screws extending in the groove, as illustrated in FIG. 5 (see second fixing member 620). Alternatively, the second fixing frame 520 may be coupled to the bottom chassis 440 by various methods such as hooks, for example, but not limited thereto.

The fixing frame 500 may further include the heat dissipation member 530 that is interposed between the first and second fixing frames 510 and 520 for rapid transfer of heat produced by the light source unit 450. As illustrated in FIG. 2, the heat dissipation member 530 may be disposed on a part (i.e., heat sink 512) where the second fixing frame 520 is seated on the first fixing frame 510.

Referring to FIG. 4, the heat dissipation member 530 may include at least one phase change material. The heat dissipation member 530 may include, for example, a polymer resin and heat transfer filler. In other words, the heat dissipation member 530 may be made of a polymer resin to form a fundamental framework of materials and to cause adhesion and also include an additive or filler having heat transfer properties.

The polymer resin may include the phase change materials. Further, the polymer resin may include the phase change material (e.g. paraffin) and a generally used adhesive resin, such as a thermoplastic resin. Thus, when heat is applied, a phase change may occur and thermal conductivity may be improved.

As described above, the phase change material may be used for the heat dissipation member 530 for the following reasons. The phase change material is a substance that minimizes a variation in temperature by absorbing a large amount of heat when the material changes phase from a solid to a liquid, and vice versa, at a certain temperature.

In the cases of FIG. 4A and FIG. 4B, the heat dissipation member 530 uses a general TIM that does not include the phase change material. The TIM usually includes a thermal grease or a thermal compound, which is a kind of thermally conductive adhesive, and is classified into two types: a hard type (FIG. 4A) and a soft type (FIG. 4B) according to its strength.

In the case of FIG. 4A, a hard type TIM is used for the heat dissipation member 530 and in the case of FIG. 4B, a soft type TIM is used for the heat dissipation member 530. When two metals (i.e., heat sink 512 and second fixing frame 520) are bonded to each other by the hard type TIM and the soft type TIM, an air gap may occur between the two metals as illustrated in FIGS. 4A and 4B because surfaces of the two metals are rough and not in contact with each other. However, in the case of using the phase change material for the heat dissipation member 530, the phase change material may change from solid to liquid due to heat emitted from the light source and the liquid phase change material may fill in the air gap between the two opposing metal surfaces so that the reduced air gap therebetween may be advantageous in heat transfer. Therefore, the heat dissipation member 530 may be formed by including the phase change material.

Meanwhile, the heat transfer filler may include at least one of iron, aluminum, nickel, silver, gold, aluminum nitride, zinc oxide, boron nitride, silicon carbide, silicon nitride, aluminum oxide, silicon oxide ("silica"), aluminum hydroxide, magnesium oxide, diamond, carbon fiber, carbon nanotube, and graphene.

Hereinafter, a heat dissipation effect resulting from applications of the fixing frame 500 according to one exemplary embodiment will be described with reference to FIG. 5 and Table 1 (below).

TABLE 1

| | | Locations for measurement | | | |
|---|---|---|---|---|---|
| | | 1 | 2 | 3 | 4 |
| Temperature | Integral fixing frame | 49.0 | 43.0 | 38.9 | 36.3 |
| | Separable fixing frame | 61.9 | 40.0 | 35.7 | 33.8 |
| | Separable fixing frame with phase change material | 52.0 | 42.3 | 38.6 | 34.9 |

Temperature changes depending on locations in the fixing frame 500 can be seen with reference to FIG. 5 and Table 1. In FIG. 5, as the location has a higher temperature, it has a more improved heat dissipation effect. The high temperature may be attributable to successful transfer of heat emitted from the light source 451 to the fixing frame 500.

Location 1 of FIG. 5 is the case of measuring the temperature in an upper end portion of the first fixing frame 511. Location 2 of FIG. 5 is the case of measuring the temperature of the second fixing frame 512 spaced 30 mm apart from the light source unit 450. Location 3 of FIG. 5 is the case of measuring the temperature of the second fixing frame 512 spaced 60 mm apart from the light source unit 450. Location 4 of FIG. 5 is the case of measuring the temperature of the second fixing frame 512 spaced 100 mm apart from the light source 450.

As described above, the integral fixing frame has low process productivity despite its good heat dissipation effect, and thus the separable fixing frame 500 according to one exemplary embodiment may be applied. However, if the fixing frame 500 is fabricated to be simply separable, the separable fixing frame 500 has lower temperatures in locations 2, 3 and 4 and also has a lower heat dissipation effect compared to the integral fixing frame as seen in Table 1. This lower heat dissipation effect is due to the delayed heat transfer in a separated portion.

In this respect, according to one exemplary embodiment, the heat dissipation member 530 may be disposed in a region where the first and second fixing frames 510 and 520 are coupled to each other so that the separable fixing frame 500 may enhance heat transfer in the coupling region. As seen in Table 1, the separable fixing frame 500 including the heat dissipation member 530 may have a high temperature at a level equivalent to the integral fixing frame. That is, the separable fixing frame 500 including the heat dissipation member 530 may have a heat dissipation effect at a level equivalent to the integral fixing frame.

Hereinafter, the fixing frame 500 according to yet another exemplary embodiment will be described with reference to FIG. 6.

Figure 6:
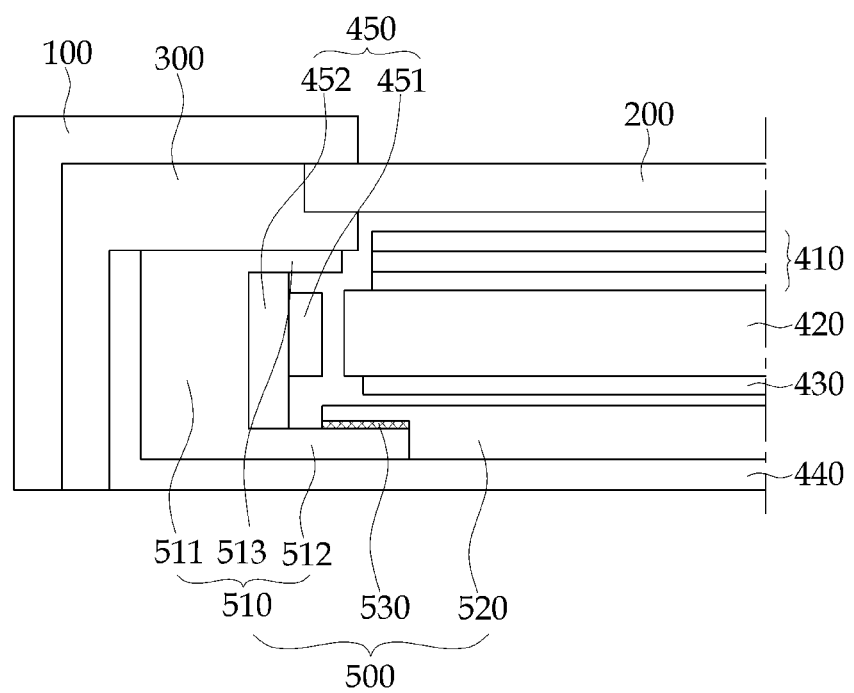
FIG. 6 is a cross-sectional view taken along line A-A' of FIG. 1 according to yet another exemplary embodiment of the invention.

FIG. 6 is a cross-sectional view taken along line A-A' of FIG. 1 according to another exemplary embodiment of the inventive concept.

Referring to FIG. 6, the fixing frame 500 may have a protrusion 513 that is bent and extends from an upper end portion of the base portion 511. The protrusion 513 may be in contact with an upper end portion of the circuit board 452 and may rapidly dissipate heat produced by the light source 451 via the additional thermal contact between the circuit board 452 and the protrusion 513.

In addition, the fixing frame 500 may be in contact with the whole surface of the circuit board 452 except for a region where the light source 451 is disposed.

From the foregoing, it will be appreciated that various embodiments of the invention have been described herein for purposes of illustration, and that various modifications may be made without departing from the scope and spirit of the present disclosure. Accordingly, the various embodiments disclosed herein are not intended to limit the scope of the inventive concept, and the true scope and spirit of the invention is indicated by the following claims, and equivalents thereof.

What is claimed is:

1. A backlight assembly comprising:
    a light source;
    a circuit board on which the light source is disposed;
    a light guide plate in which light emitted from the light source is incident on one surface and the incident light is emitted to another surface;
    a bottom chassis configured to accommodate the light guide plate; and
    a fixing frame coupled to the bottom chassis and configured to fix the circuit board thereto,
    wherein the fixing frame comprises:
    a first fixing frame on which the circuit board is disposed and which comprises at least one heat sink; and
    a second fixing frame separably coupled to the first fixing frame and disposed on a bottom surface of the bottom chassis, and
    the at least one heat sink is interposed between the bottom chassis and the second fixing frame.

2. The backlight assembly of claim 1, wherein the fixing frame is in contact with the circuit board and releases heat produced by the light source.

3. The backlight assembly of claim 1, further comprising a heat dissipation member interposed between the first and second fixing frames.

4. The backlight assembly of claim 3, wherein the heat dissipation member comprises a phase change material.

5. The backlight assembly of claim 1, wherein the first fixing frame is disposed between the bottom chassis and the circuit board.

6. The backlight assembly of claim 1, wherein the first fixing frame further comprises a base portion, and
the at least one heat sink protrudes from one surface of the base portion.

7. The backlight assembly of claim 6, wherein the heat sink is coupled to the second fixing frame.

8. The backlight assembly of claim 7, further comprising a heat dissipation member interposed between the heat sink and the second fixing frame.

9. The backlight assembly of claim 1, wherein the second fixing frame is disposed between the light guide plate and the bottom chassis.

10. The backlight assembly of claim 9, wherein the second fixing frame is shaped like a plate.

11. The backlight assembly of claim 9, wherein the second fixing frame is larger in area than the first fixing frame.

12. The backlight assembly of claim 1, further comprising a fixing member configured to fix the fixing frame to the bottom chassis.

13. The backlight assembly of claim 1, further comprising:
a liquid crystal display panel; and
a mold frame on which the liquid crystal display panel is seated.

14. The backlight assembly of claim 13, further comprising a first fixing member configured to couple the mold frame and the first fixing frame to each other.

15. The backlight assembly of claim 1, further comprising a second fixing member configured to couple the second fixing frame and the bottom chassis to each other.

16. The backlight assembly of claim 1, wherein the first fixing frame is in contact with at least one surface of an upper surface, lower surface, and rear surface of the circuit board when the light source is disposed on a front surface opposite the rear surface of the circuit board in a cross section view.

17. The backlight assembly of claim 1, wherein the fixing frame is disposed at a corner portion of the bottom chassis.

18. The backlight assembly of claim 1, further comprising a heat dissipation material interposed between the circuit board and the fixing frame,
wherein the heat dissipation material includes a thermally conductive adhesive layer or a graphite sheet.

19. The backlight assembly of claim 18, wherein the thermally conductive layer includes adhesive polymer resins comprising one of a silicone based resin, an acrylic resin, and a urethane based resin.

20. The backlight assembly of claim 1, wherein the fixing frame has a structure divided into two parts each comprising one of a metal, powder or a polymer including metal powder.

21. A backlight assembly comprising:
a light source;
a circuit board on which the light source is disposed;
a light guide plate in which light emitted from the light source is incident on one surface and the incident light is emitted to another surface;
a bottom chassis configured to accommodate the light guide plate;
a fixing frame which is coupled to the bottom chassis, is configured to fix the circuit board thereto, and comprises:
a first fixing frame on which the circuit board is disposed; and
a second fixing frame separably coupled to the first fixing frame and disposed on a bottom surface of the bottom chassis, and
a heat dissipation member disposed directly on a planar surface of the first fixing frame and a planar surface of the second fixing frame which are opposite to each other.

* * * * *